Feb. 19, 1963  R. W. ENGLE  3,078,067
VALVE HAVING HEAT DISSIPATING HEAD STRUCTURE
Filed Oct. 28, 1959
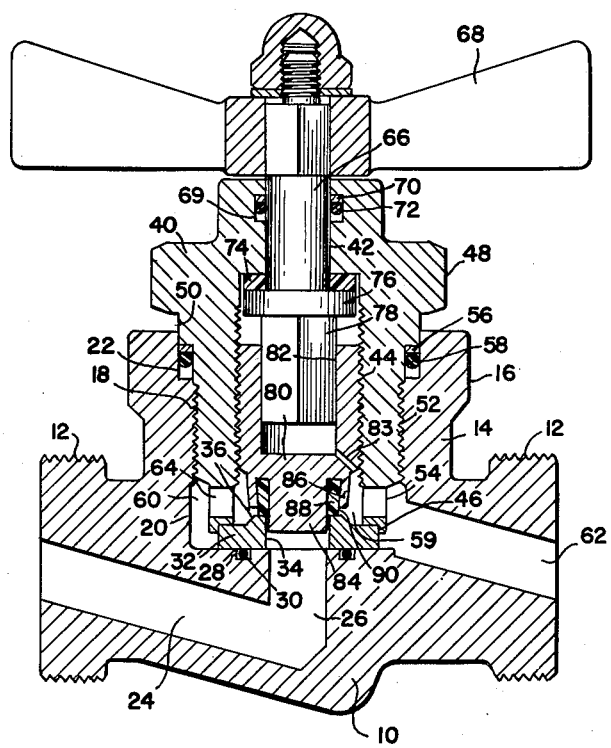
INVENTOR.
ROBERT W. ENGLE
BY
*Brasen, Smith & Harding*
ATTORNEYS 3,078,067
VALVE HAVING HEAT DISSIPATING
HEAD STRUCTURE
Robert W. Engle, Drexel Hill, Pa., assignor to Combination Pump Valve Company, Philadelphia, Pa., a corporation of Pennsylvania
Filed Oct. 28, 1959, Ser. No. 849,374
5 Claims. (Cl. 251—121)

This invention relates generally to valve structures, and particularly to seated valves adapted to effect complete shut-off in pipe lines subjected internally to high pressures.

Metal to non-metal seated valves are known to be superior to metal to metal seated valves for use in pipe lines subjected internally to high pressures, and nylon is known to be superior for use in making the non-metal valve elements, the latter commonly being in the form of discs. Since these valve elements normally are fully exposed to the temperatures in the lines, they may be made of nylon only when the pipe lines are subjected internally to temperatures below the softening temperature of nylon.

This invention provides a metal to nylon seated valve which may be effectively utilized when the conditions of operation are such that occasionally there may be experienced a short period during which the temperature internally of the valved line is abnormally high, i.e., materially higher than the softening temperature of nylon. For example, air or oxygen may be supplied from a source thereof to a point of consumption through a pipe line equipped with such a valve operable for controlling the flow through the line. The source commonly is a vessel containing air or oxygen under high pressure. When the contents of the vessel is spent, the vessel is replaced by another vessel containing a fresh supply of air or oxygen under pressure. This operation is effected by closing the control valve and then changing the vessels. The fresh vessel is equipped with an outlet valve which is opened to let the air or oxygen into the pipe line. Then the control valve is reopened to pass the air or oxygen on to the point of consumption. In the event of the accidental accumulation of a little oil in the control valve and/or the section of the pipe line between the vessel and the control valve, the high pressure suddenly applied when the outlet valve aforesaid is opened may be enough to fire the oil. Thus dieseling or a diesel action explosion may occur. The resulting temperature, much above the temperature encountered during normal operation, may damage the nylon disc. Accordingly, one object of the present invention is to provide improved closure means for valve structures utilized in pipe lines subjected internally to high pressures, wherein the diesel action may occur.

Other objects of the invention will become apparent when the following description is read with reference to the drawing, the FIGURE of which is a longitudinal section through a valve structure constructed in accordance with the invention.

Referring to the drawing, the exemplary valve structure comprises a body 10 having respectively at opposite ends thereof externally threaded flanges 12 for connection in a pipe line. Intermediate the flanges 12 is a lateral extension 14 terminating in a flange 16. The extension 14 is provided with an internally threaded central bore 18 terminating in an enlarged bore section 20 at the inner end thereof and an enlarged bore section 22 at the outer end thereof. Extending though one of the flanges 12 is an inlet passage section 24 communicating with an inlet passage section 26 which in turn communicates with the bore section 20. At the base of the bore in the extension 14 is an annular groove 28 extending about the passage 26, and nested in this groove is an O-ring 30. Overlying the O-ring is a valve seat ring 32 having an opening 34 extending through a central portion 36 of the ring.. The opening 34 is concentric with the passage 26 and its diameter is slightly greater than that of the passage 26.

The bore in the extension 14 receives a bonnet 40 which is provided with a central bore 42 communicating with an internally right-hand threaded enlarged diameter bore 44 terminating in a still further enlarged diameter bore 46. The top of the bonnet is provided with a hexagonal formation 48 under which is a cylindrical section 50, and an externally threaded reduced diameter section 52 terminating in a still further reduced diameter section 54. The bonnet 40 is threaded into the extension 14, the threads aforesaid being left-hand threads. When fully projected into the extension 14 the inner end of the bonnet receives the ring 32 and clamps the same securely in place. Interposed between the bonnet 40 and extension 14 is a backup ring 56 and an O-ring 58.

It will be apparent that the valve is thus provided with an main chamber 59 defined by the top wall of the bonnet, the ring 34 and the underlying wall supporting the same and the cylindrical wall of the bonnet defining the bore 44. It will also be apparent that the valve is thus provided with an annular auxiliary chamber 60 extending about the terminal portion 54 of the bonnet and the periphery of the valve seat ring 32, the outer wall of the auxiliary chamber being defined by the bore section 20 formed in the extension 14. The valve body 10 is provided with an outlet passage 62 communicating with the auxiliary chamber, which chamber is placed in communication with the main chamber 59 through the medium of a plurality of circumferentially equally spaced apertures 64 formed in the terminal portion 54 of the bonnet.

Extending through the top of the bonnet is a stem 66 provided with a handle 68. The bore 42 is provided with an annular groove 69 which houses a backup ring 70 and an O-ring 72. The stem carries a thrust washer 74 made of Teflon and seated upon a flange 76 extending radially from the stem, which stem terminates in a portion 78 which is square in transverse section. Interposed between the flange 76 and the ring 32 is a valve guide 80 threaded into the bore 44 and having the terminal portion 78 of the stem projected freely into a square opening extending axially into the guide 80. Placing the square opening 82 in communication with the main chamber 59 is an oil hole 83. The inner terminal portion 84 of the guide 80 is cylindrical and of a diameter adapted for being projected freely, but with only slight clearance, e.g., of the order of a few thousandths of an inch, into the opening 34 of the ring 32. Extending about the cylindrical portion 84 in concentric radially spaced relation thereto is a sleeve element 86. Fitted over the terminal portion 84 is a tubular nylon element 88 secured in place by the sleeve element 86. The outer surface 90 of the element 88 is axially tapered and the sleeve 86 is correspondingly tapered so as to prevent axial shifting movement of the element 88. Preferably the element 86 is initially formed with a uniform internal diameter and then, after the element 88 is fitted over the terminal portion 84, the sleeve element 86 is deformed so as to taper axially to correspond with the taper of the element 88. The terminal surface of the element 88 is set back from the terminal surface of the portion 84, and the terminal surface of the element 86 is axially set back from the terminal surface of the element 88.

As shown, the valve is closed. The tip of the portion 84 is slidably projected into the opening or port 34 in the ring 32, and the element 88 is seated upon the valve seat or upper surface of the inner marginal portion of the ring 32. The terminal portion of the sleeve element 86 is disposed in spaced relation to the ring 32.

To open the valve, the handle 68 and the stem 66 are turned in a counter-clockwise direction to thread the guide 80 outwardly. The stem is secured against axial shifting movement, as will be apparent, and the guide 80 moves axially relative to the stem, whereupon the portion 84 is withdrawn from the ring 32, and the nylon element 88 is raised from its seat upon the uppermost surface of the ring 32, opening the valve for passage of the flowing medium through the passages 24 and 26, the inlet port 34, main chamber 59, apertures 54, auxiliary chamber 60 and passage 62. In this condition of the valve the terminal portion of the nylon element 88, as well as the tip of the portion 84 of the guide 80, is exposed to the pressure and temperature in the line. To close the valve, of course, the handle 68 is turned in the opposite clockwise direction until the tip of the portion 84 of the guide 80 again enters the port 34 and the nylon element 88 is again seated upon the ring 32.

When the diesel action occurs in the line, the valve is closed, and in this condition of the valve, the tip of the portion 84 is fully exposed to the high pressure and temperature generated by the explosion. However, the nylon element 88 is exposed only through the very small annular opening between the cylindrical outer surface of the element 84 and the cylindrical inner surface 34 of the ring 32. During traverse of gases through the small opening aforesaid they come into contact with the large metallic bodies 32 and 84. Thus some of the heat is dissipated and the gases that reach the nylon element 88 are not only rather inconsequential in volume but also reasonably low in temperature.

It will be understood, of course, that the present invention as hereinbefore described and shown in the accompanying drawing is susceptible of various changes and modifications without departing from the invention. For example, although the valve described and shown in the drawing is a globe valve, the invention is applicable to other types of valves, such as angle valves. In addition, although the tubular element 88 is described as being made of nylon, it might be made of another thermoplastic material. Accordingly, the invention is not to be regarded as restricted except as required by the appended claims.

What is claimed is:

1. In a valve for use in a pipe line subjected internally to high pressures, the combination comprising means providing a hollow valve body having inlet and outlet ports, means providing a valve seat extending about said inlet port, and closure means for said inlet port including a terminal portion made of metal and extending into and removably fitting with slight circumferential clearance in said inlet port, and an annular element made of an organic plastic material, carried by said terminal portion and removably engaged with said valve seat, said terminal portion and annular element being conjointly operative to close said inlet port, said terminal portion projecting substantially beyond said element to provide a substantial mass for protecting said element from contact with gas within said inlet port and for dissipating heat.

2. In a valve for use in a pipe line subjected internally to high pressures, the combination comprising means providing a hollow valve body having inlet and outlet ports, means providing a valve seat extending about said inlet port, and closure means for said inlet port including a terminal portion in the form of a solid cylindrical mass of metal extending into and removably fitting with slight circumferential clearance in said inlet port, and a tubular element made of an organic plastic material and fitted over said cylindrical terminal portion, one end thereof being engaged with said valve seat, said cylindrical terminal portion and tubular element being conjointly operative to close said inlet port, said terminal portion projecting substantially beyond said element to provide a substantial mass for protecting said element from contact with gas within said inlet port and for dissipating heat.

3. In a valve for use in a pipe line subjected internally to high pressures, the combination comprising means providing a hollow valve body having inlet and outlet ports, means providing a valve seat extending about said inlet port, and closure means for said inlet port including a cylindrical terminal portion made of metal and removably fitting with slight circumferential clearance in said inlet port, a tubular element made of nylon and provided with an axially tapering outer surface, one end thereof being engaged with said valve seat, and axially tapering means embracing said nylon element and engaging the axially tapering outer surface of the nylon element for clamping the nylon element to said terminal portion of the closure means, said cylindrical terminal portion and tubular element being conjointly operative to close said inlet port, said terminal portion projecting substantially beyond said element to provide a substantial mass for protecting said element from contact with gas within said inlet port and for dissipating heat.

4. In a valve for use in a pipe line subjected internally to high pressures, the combination comprising means providing a hollow valve body having inlet and outlet ports, means providing a valve seat extending about said inlet port, and closure means for said inlet port including a cylindrical terminal portion made of metal and removably fitting with slight circumferential clearance in said inlet port, a tubular element made of nylon and provided with an axially tapering outer surface, the terminal surface of said nylon element being engaged with said valve seat, and a sleeve element embracing said nylon element and tapering axially for engaging the tapering surface of said nylon element and for clamping said nylon element to said cylindrical terminal portion, the terminal surface of said nylon element being axially set back a substantial distance from the terminal surface of said cylindrical terminal portion, the terminal surface of said sleeve element being axially set back a substantial distance from the terminal surface of said nylon element. said cylindrical terminal portion and tubular element being conjointly operative to close said inlet port.

5. In a valve for use in a pipe line subjected internally to high pressures, the combination comprising means providing a valve body having a valve chamber therein, means providing inlet and outlet passageways communicating with said valve chamber, means providing a valve seat surrounding said inlet passageway, and means cooperable with said valve seat for controlling flow through said inlet passageway including a terminal portion having a peripheral wall of substantially the same dimension as the portion of said inlet passageway immediately upstream of said valve seat, said wall being constructed to provide a slight clearance between said terminal portion and said inlet passageway for preventing fluid flow, and an annular valve member of an organic plastic mounted on said terminal portion, said valve member and said terminal portion being movably mounted for movement relative to said valve seat for closing said inlet passageway, said valve member being engageable with said valve seat, said terminal portion projecting substantially beyond said valve member to provide a substantial mass for protecting said valve member from contact with gas in said inlet passageway and for dissipating heat.

References Cited in the file of this patent

UNITED STATES PATENTS

| | | |
|---|---|---|
| 1,080,791 | Trinder | Dec. 9, 1913 |
| 2,345,693 | Wilson | Apr. 4, 1944 |
| 2,414,908 | Smith | Jan. 28, 1947 |
| 2,646,246 | Tucci | July 21, 1953 |
| 2,925,994 | Downs | Feb. 23, 1960 |

FOREIGN PATENTS

| | | |
|---|---|---|
| 496,770 | Italy | of 1954 |

OTHER REFERENCES

Groke: German application 1,082,471, printed May 25, 1960 (KL 47g 40/03), 1 sht. dwg.; 1 p. spec.